United States Patent

Sheets

[11] Patent Number: 5,104,135
[45] Date of Patent: Apr. 14, 1992

[54] BOTTLED WATER CARRIER FOR TRANSPORTING BOTTLES OF WATER HAVING A CAPACITY OF ON THE ORDER OF FIVE GALLONS

[76] Inventor: Kerney T. Sheets, P.O. Box 771, Babin Rd., Duplessis, La. 70728

[21] Appl. No.: 701,357

[22] Filed: May 10, 1991

Related U.S. Application Data

[62] Division of Ser. No. 366,644, Jun. 15, 1989, abandoned.

[51] Int. Cl.⁵ .................................................. B62B 1/06
[52] U.S. Cl. ........................................ 280/47.19; 211/74; 280/47.33; 280/79.3; 280/79.6
[58] Field of Search .................. 280/47.17, 47.19, 47.24, 280/47.33, 79.2, 79.6, 79.7, 79.3, 79.4, 47.35, 47.23; 211/74, 79; 414/490, 457

[56] References Cited

U.S. PATENT DOCUMENTS

| D. 270,136 | 8/1983 | Cox | D9/350 |
|---|---|---|---|
| 2,453,246 | 11/1948 | Moksnes | 280/47.24 |
| 2,522,894 | 9/1950 | Putman | 280/47.23 |
| 2,723,863 | 11/1955 | Mattio | 280/47.24 |
| 4,205,937 | 6/1980 | Fawley | 280/47.19 |
| 4,418,969 | 12/1983 | Hettman | 211/74 |
| 4,753,445 | 6/1988 | Ferrare | 280/47.17 |

FOREIGN PATENT DOCUMENTS

| 227962 | 5/1960 | Australia | 280/47.24 |
|---|---|---|---|
| 280834 | 9/1988 | European Pat. Off. | 211/74 |
| 1194258 | 11/1959 | France | 280/47.24 |
| 1531622 | 5/1968 | France | 280/79.3 |
| 1577963 | 8/1969 | France | 211/74 |
| 2491852 | 4/1982 | France | 280/47.17 |
| 513762 | 2/1955 | Italy | 414/490 |
| 206873 | 8/1939 | Switzerland | 280/47.24 |
| 345248 | 4/1960 | Switzerland | 414/457 |
| 1245486 | 7/1986 | U.S.S.R. | 280/79.3 |
| 2047526 | 12/1980 | United Kingdom | 211/74 |

*Primary Examiner*—Andres Kashnikow
*Assistant Examiner*—Eric Culbreth
*Attorney, Agent, or Firm*—Pravel, Gambrell, Hewitt, Kimball & Krieger

[57] ABSTRACT

A wheeled transporting device for use in carrying large five-gallon bottled water containers uses an improved frame configuration that cradles one or more of the bottles between appendages that extend outwardly, horizontally of the frame when the frame is vertically positioned.

7 Claims, 2 Drawing Sheets

BOTTLED WATER CARRIER FOR TRANSPORTING BOTTLES OF WATER HAVING A CAPACITY OF ON THE ORDER OF FIVE GALLONS

This is a continuation divisional of co-pending application Ser. No. 07/366,644 filed on June 15, 1989 now abandoned.

BACKGROUND OF THE INVENTION

1. Field of the Invention

The present invention relates to the bottled water industry and more particularly to a sheeled dolly/hand truck for transporting large five-gallon plastic jugs of bottled water.

2. General Background

There are a number of commercially available sources of drinking water typically spring water contained in plastic reusable bottles. The most common of these reusable plastic bottles is a standard five-gallon plastic jug having a narrow mouth and a flat bottom portion. Typically these five-gallon jugs having two or more annular rims extending outwardly from the bottle side wall to facilitate a carrying of the jugs and to provide rolling surfaces when the jugs are rolled on their sides. Such five-gallon bottled water containers are commercially available from a number of sources and are typically returned by the user when the water has been consumed therefrom. One example of a five-gallon spring water container is the subject of Design Patent D-270,136. Such bottles are manufactured by Liquie-Box of Worthington, Ohio.

A number of coolers/dispensers are commercially available for use in dispensing bottled water from such five-gallon bottled water containers. One of the most common types of commercially available bottled water dispensers is an inverted bottle type construction wherein the bottle is turned upside down into an open receptacle or well which is on the top of the cooler dispenser. The bottle must be lifted approximately four feet, turned upside down, placed into the well for use. Water is thereafter dispensed from the cooler dispenser by depressing dispensing buttons upon spigots which extend forwardly of the cabinet of the cooler/dispenser.

Such five-gallon bottled water containers are heavy weighing approximately fifty pounds each. A problem exists in that these bottled water dispensers are typically delivered to the home or to offices in multiples of, for example, two to five bottles at a time. This produces wear and tear upon delivery personnel that must remove these bottles from trucks, often a substantial distance from the home, office buildings, businesses, and the like. Thus, there is a need for a bottle water carrier which can easily and safely transport multiple bottles of large five-gallon bottled water containers.

Another problem with the use of five-gallon containers is the weight associated with these containers even when handled one at a time by the consumer. For example, older people and handicapped people are typically required to pay for bottled water in much smaller capacities because of the weight associated with the more economical five-gallon containers. This unfairly punishes older and handicapped people because typically bottled water costs much more when purchased in small quantities of, for example, one half-gallon or one gallon.

Thus, there is a need for a simple, easy to use, easy to construct carrier for bottled water when such water is contained in large bottles of five gallons the most economical commercially available version of bottled water in this country.

SUMMARY OF THE PRESENT INVENTION

The present invention solves these prior art problems and shortcomings in a simple, straightforward fashion by providing a bottled water carrier for transporting bottles of water each having a capacity of, on the order of, five gallons. The apparatus includes an elongated frame having at its lower end portion an axle to which are mounted a pair of spaced-apart wheels positioned generally on opposite sides of the lower end of the frame. The upper end portion of the frame has a handle with a gripping surface thereon and at least two pair of arms extend forwardly of the frame during use, generally away from the user, the arms defining load carrying portions for transferring load from the bottle to the frame. In one version, a single bottle carrier is provided which can lift and transport the bottle. The single bottle carrier is of greatest utility to the homeowner, especially the aged, handicapped and/or less than powerful people. A second version in the form of a multiple bottle carrier is provided primarily for use by delivery personnel carrying two, three, four or five bottles at a time.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 1:
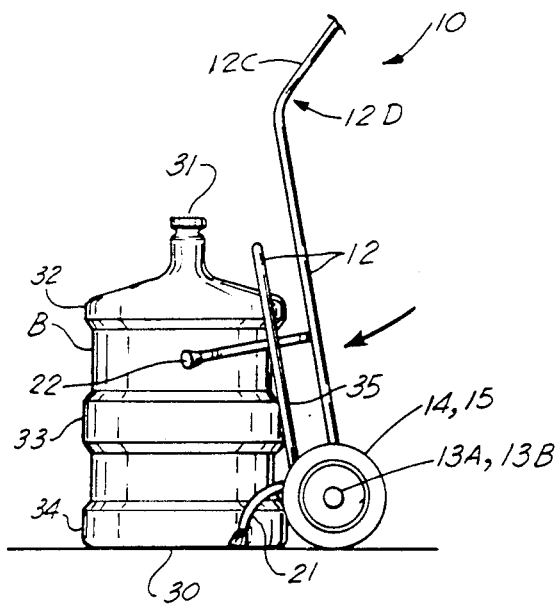
FIG. 1 is a side view of a first embodiment of the apparatus of the present invention as shown during pickup of a bottled water container.
Figure 2:
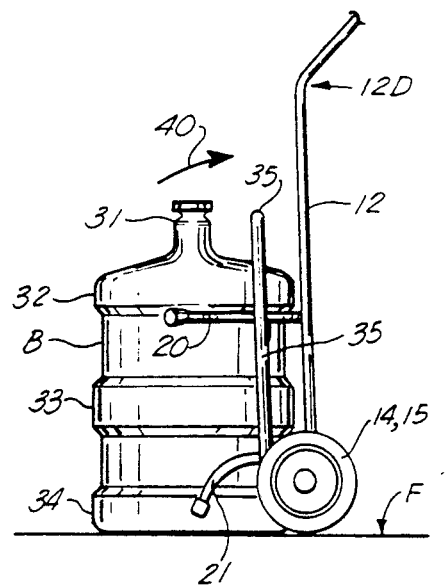
FIG. 2 is a side view of the first embodiment of the apparatus of the present invention shown during transport of the bottled water container after pickup engages the bottle with the frame.
Figure 3:
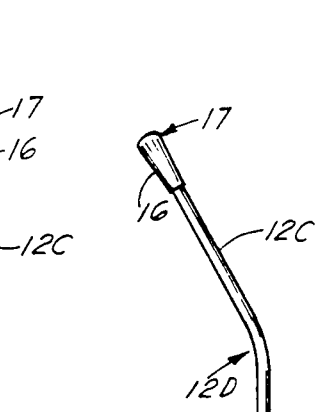
FIG. 3 is front view of the first embodiment of the apparatus of the present invention.
Figure 4:
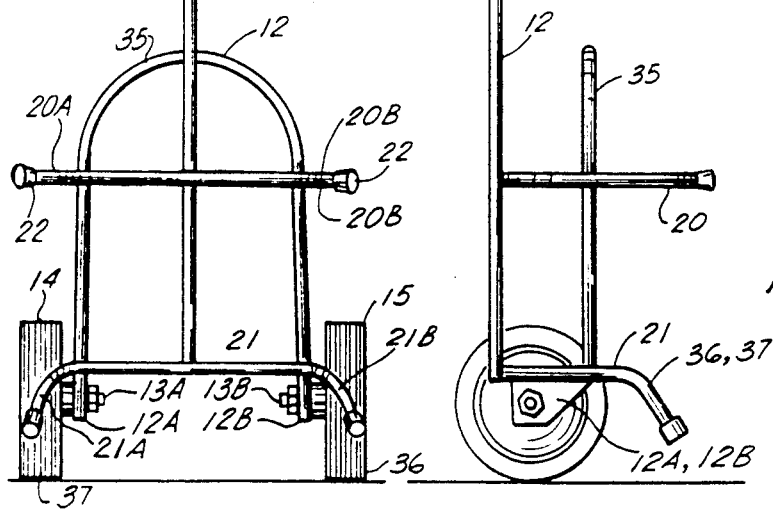
FIG. 4 is a side view of the first embodiment of the apparatus of the present invention.
Figure 5:
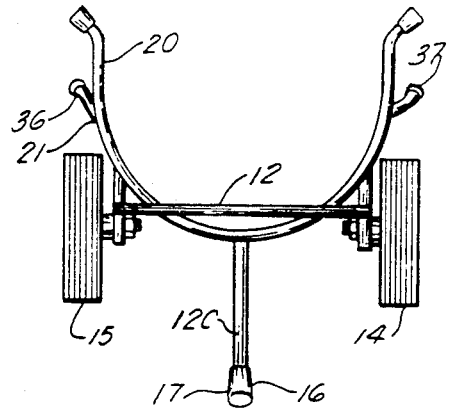
FIG. 5 is a top view of the first embodiment of the apparatus of the present invention.

In FIGS. 1-5 there can be seen a first embodiment of the apparatus of the present invention in the form a single bottled water carrier designated generally by the numeral 10. The apparatus includes an elongated frame 12 having a lower end portion of the frame 12 carrying an axle 13 with the preferred construction including left and right axles 13A, 13B, each mounted upon gussets 12A, 12B respectively. Each axle carries a wheel 14, 15 at the lower end portion of frame 12. The upper end portion of frame 12 includes rearwardly curving portion 12C defining a concave portion 12D of the frame 12. A handle 16 is mounted upon portion 12C with a gripping surface 17 thereon so that a user, delivery person, or the like can grip the surface 17 and push the frame 12 carrying a bottle B therewith during transportation.

At least two pair of arms 20, 21 are provided including upper pair of arms which include left and right arms 20A, 20B. Rubber end caps 22 can be placed respectively on each arm 20A, 20B so that the end caps 22 help grip the bottle B during lifting, as shown in FIG. 1. The bottle B of water typically would be in a large capacity bottle B having a capacity of, on the order of, five gallons. An example of such a bottle is disclosed in Design Patent D-270,136 incorporated herein by reference. Such bottles B are commonly used for transporting and dispensing bottled spring water, for example, and they typically include a bottom 30 which is generally flat, a narrow mouth 31, and one or more annular ribs 32-34 which aid in lifting the bottle B and also define surfaces for rolling bottle B thereon, such as during handling at bottling plants and the like.

The frame 12 includes a generally U-shaped vertically upstanding portion 35 which forms a connection with each pair of arms or appendages 20, 21. The lower pair of arms 21 includes arms 21A, 21B. Each arm 21A, 21B includes a downwardly and forwardly extending foot 36, 37 which in combination with wheels 14, 15 defines a four-point support base so that the apparatus 10 is self-supporting in a generally vertical position, as shown in FIG. 1. The feet 36, 37 also define a forwardly inclined position which is typically assumed prior to the lifting of a bottle B, as shown in FIG. 1. The arms 20, 21 can be so positioned upon frame 12 that the arms 20, 21 register just below one or more of the annular ribs 32-34 so that a lifting up of the arms 20, 21 by rotating the frame 12 rearwardly (as shown by arrows in FIG. 2) causes each pair of arms 20, 21 to register upon one of the ribs 32-34 to aid in the lifting of bottle B. In the embodiments of FIGS. 1-5, the upper pair of arms 20 register slightly below the annular rib 32 when the frame 12 is rotated rearwardly as illustrated by the arrow 40 in FIG. 2. Further rotation of the frame 12 about axles 13A 13B in the direction of arrow 40 lifts bottle B free of the floor, so that transport can commence. The handle 16 can be rotated all the way to the floor with arms 20, 21 extending upwardly to support bottle B horizontally such as prior to placement on a cooler/dispenser.

Figure 6:
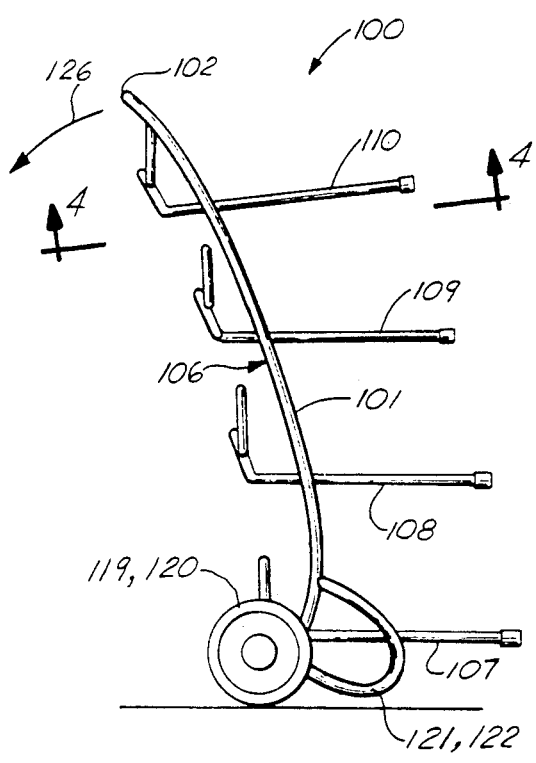
FIG. 6 is a side view of a second embodiment of the apparatus of the present invention in the form of a multiple bottle water carrier.
Figure 7:
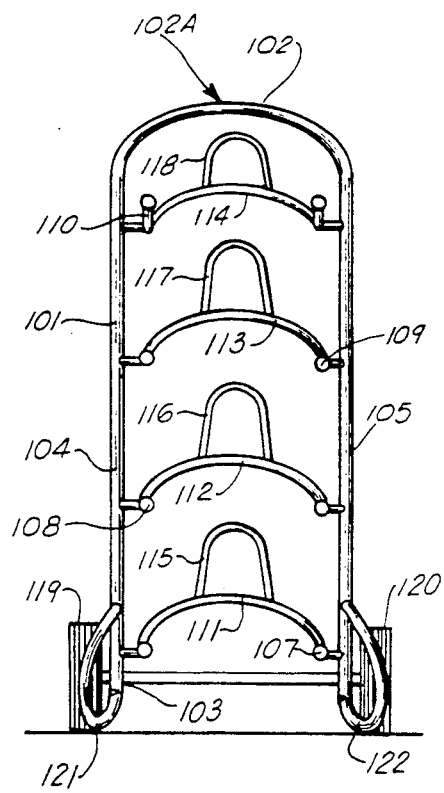
FIG. 7 is a front view of the bottle water carrier of FIG. 6.

In the embodiment of FIGS. 6-9, a multiple bottle B carrier is disclosed designated generally by the numeral 100. In the multiple bottled water carrier 100, there can be seen an elongated frame 101 having upper 102 and lower 103 end portions. The frame includes a pair of spaced-apart generally vertical stringer members 104, 105 each being curved and producing by such curvature a concave surface 106 which faces the user during use. Typically, the user would stand on the opposite side of members 104, 105 from a plurality of forwardly extending pairs of arms 107-110. As can best be seen in FIG. 9 (illustrated with pair 110), each pair of arms 107-110 includes left and right arms 107A-107B, 108A-108B, 109A-109B, 110A-110B which are connected at their rear most portion by U-shaped members 111-114 respectively. Each U-shaped member 111-114 carries respectively at its center portion a generally upstanding stop member 115-118 (FIG. 7). The arms 110A-110B are spaced less than the diameter of the bottle B.

Figure 8:
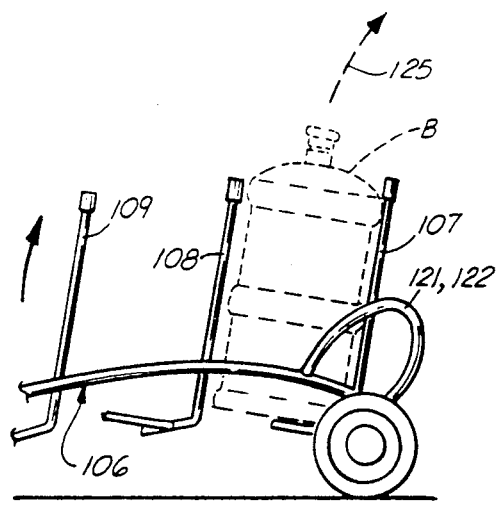
FIG. 8 is a side fragmentary view of the bottle water carrier of FIG. 6 illustrating a dispensing position for removing the bottles during unloading thereof.
Figure 9:
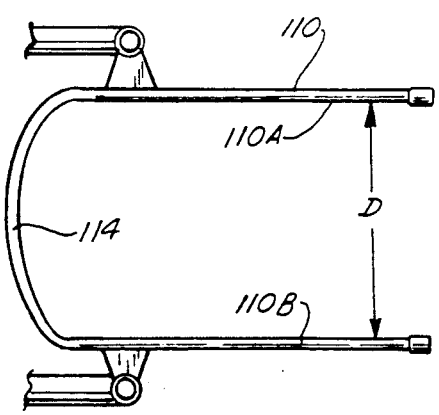
FIG. 9 is a fragmentary view of a second embodiment of the apparatus of the present invention.

The apparatus 100 of the embodiment of FIGS. 6-9 can be supported vertically as a self-standing stable structure even when loaded with bottles, resting upon its pair of wheels 119-120 and upon a pair of forwardly extending spaced-apart feet 121-122. The frame 101 can also be horizontally supported (FIG. 8).

During use, the user simply grips the frame 101 at its uppermost 102 end portion which defines a gripping surface 102A for grasping by a user. The user stands facing the concave 106 portion of frame 101 with the generally U-shaped portions 107-110 extending away from the user. The user can then leave the apparatus 10 in an upstanding position resting upon the combination of its wheels 119, 120 and its feet 121, 122, as shown in FIG. 6.

When unloading bottles B, as indicated by the arrow 125 in FIG. 8, the user can simply grip surface 102 and lower it downwardly so that the frame 101 eventually assumes a generally horizontal position of the elongated side members 104, 105. This position is shown in FIG. 8 wherein the supporting is by means of wheels 119, 120 and handle 102A. The arrow 125 illustrates removal of bottle B such as during an unloading for delivery. The apparatus 100 of the present invention securely holds multiple bottles B, each being on the order of, for example, five gallons of capacity, during transportation, during unloading, or during a stationary position (either horizontal or vertical) wherein the bottles are at rest such as when the delivery person is speaking with a customer, taking an order, delivering an invoice, or the like. This flexibility enables the delivery person to leave the frame in a vertical position unless unloading, eliminating substantial back breaking work in leaning over and lifting or lowering the frame when not necessary.

The present invention provides a very stable system for carrying multiple bottles which is an improvement over the common hand truck or rolling wagon in that it securely holds the bottles notwithstanding the position of the frame, be it in a generally vertical or in a generally horizontal position. The curved configuration of the frame 101 provides a very even balance of load, allowing the user to position bottles both forwardly and rearwardly of the wheel base during transportation so that the weight is very evenly distributed with respect to the wheels. The user can simply rotate the frame 101 forwardly or backwardly upon the wheel base until he "feels" a neutral balance as the bottles balance each other on opposite sides of the axles. Only the forward load component must be overcome, namely, overcoming rolling frictional resistance. There is little or no lifting required by the operator with regard to any vertical load component of the weight of the bottles during transport. These vertical bottle load components are cancelled because of the forward and aft positioning of the bottles during transport and thus a balancing of the load.

In view of the numerous modifications which could be made to the preferred embodiments disclosed herein without departing from the scope or spirit of the present invention, the details herein are to be interpreted as illustrative and not in a limiting sense.

What is claimed as invention is:

1. A bottled water carrier for transporting four bottles of water, each having a sidewall portion and a bottom portion comprising:

a) an elongated longitudinally extending frame having a lower end portion and an upper end portion;
b) a pair of spaced apart wheels mounted respectively upon opposite sides of the lower end portion of the frame;
c) the upper end portion of the frame having a handle providing a gripping surface thereon;
d) four spaced apart pairs of appendages, each pair mounted rigidly and transversely with respect to the longitudinal frame and a major portion of each pair extending in front of the frame and away from a user that is transporting the carrier, each pair of appendages defining spaced apart, load-carrying portions for transferring load from the side wall portion of each bottle to the frame; and
e. one of said pairs of appendages positioned adjacent the wheels and another of said pairs of appendages positioned adjacent the handle.

2. The apparatus of claim 1, wherein the frame is generally curved providing a concave surface which faces the user during operation.

3. A bottled water carrier for transporting multiple bottles of water, each having a sidewall and a bottom wall, comprising:
a) an elongated frame with front and rear surfaces, the frame including left and right longitudinally extending frame members;
b) the lower end of the frame carrying an axle;
c) a pair of wheels rotatably mounted upon the axle on generally opposite sides of the lower end of the frame;
d) the upper end portion of the frame having a handle providing a gripping surface thereon;
d) multiple pairs of appendages for simultaneously carrying a corresponding plurality of bottles, each pair of appendages mounted rigidly and transversely with respect to the longitudinally extending frame members, a substantial portion of each pair extending in front of the frame during use and generally away from the user, the respective pairs of appendages being spaced along the frame beginning with a lower pair of appendages positioned adjacent the axle and wheels, at least one pair of appendages positioned at the central portion of the frame and a third pair of appendages positioned at the upper end portion of the frame adjacent the handle, each pair of appendages defining a separate load-carrying portion for transferring load from the side wall portion of a bottle to the frame; and
f) a stop member on the frame and associated with each pair of appendages, and extending angularly with respect to each pair of appendages for engaging the bottom of the bottle being supported by a pair of appendages.

4. The apparatus of claim 1 or 3, wherein each pair of appendages defines a generally U-shaped configuration that registers with the curvature of the outer surface of the bottle of water being transported.

5. The apparatus of claim 1 or 3, wherein the frame is self-supporting in a generally vertical position wherein each bottle of water supported assumes a position horizontally spaced from the horizontal position of the other bottles.

6. The apparatus of claim 1 or 3, wherein there is further provided one or more feet extending from the frame in spaced relation to the wheels for forming in combination with the wheels a stable support so that the carrier can stand upright, resting upon the foot and wheels.

7. The apparatus of claim 1 or 3, wherein the appendages engage the bottle during use forwardly of the wheels when the bottle rests upon a flat surface in a generally vertical position.

* * * * *